Aug. 28, 1923.
E. F. McCARTHY
SHOCK ABSORBER FOR VEHICLES
Filed Oct. 10, 1921
1,466,368
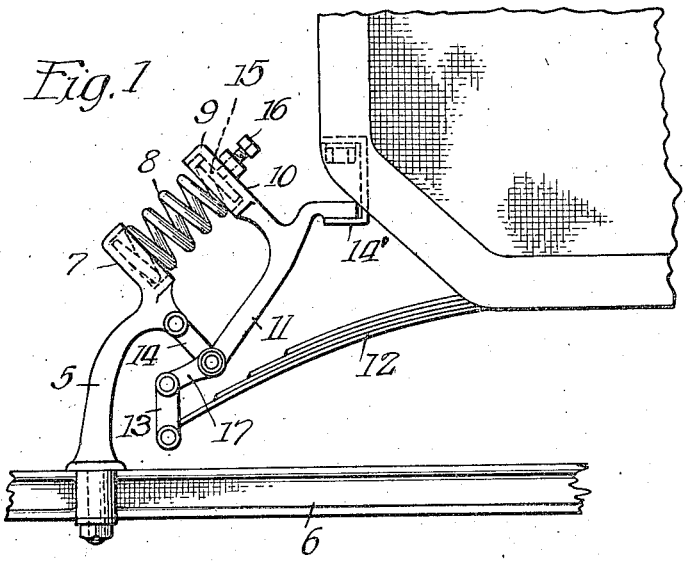
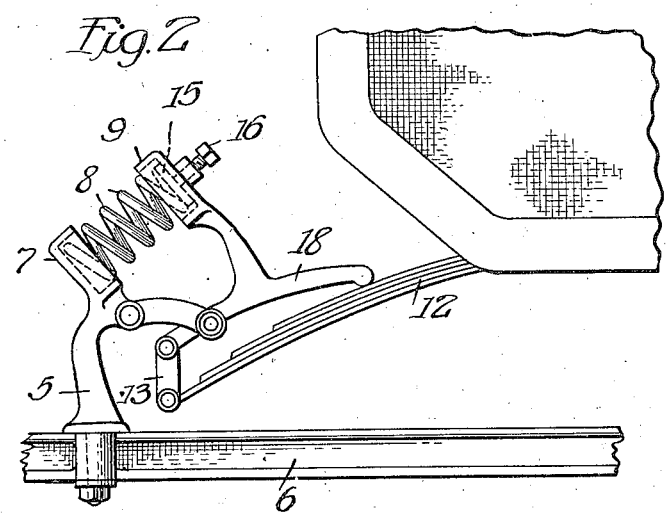
Inventor:
Edward F. McCarthy,
By Fisher, Towle, Clapp & Soans
attys Patented Aug. 28, 1923.

1,466,368

UNITED STATES PATENT OFFICE.

EDWARD F. McCARTHY, OF CHICAGO, ILLINOIS, ASSIGNOR TO THE RAMO MANUFACTURING COMPANY, OF CHICAGO, ILLINOIS, A CORPORATION OF ILLINOIS.

SHOCK ABSORBER FOR VEHICLES.

Application filed October 10, 1921. Serial No. 506,579.

*To all whom it may concern:*

Be it known that I, EDWARD F. McCARTHY, a citizen of the United States, residing in Chicago, in the county of Cook and State of Illinois, have invented certain new and useful Improvements in Shock Absorbers for Vehicles, of which the following is a specification.

This invention relates to shock absorbers for automobiles and other vehicles but more particularly to that type of shock absorber in which a coil spring is used in connection with the usual leaf spring of the vehicle.

The principal objects of the present invention are to provide a simple and desirable device which may be readily attached to a vehicle and which will practically dissipate shocks due to both downward and rebound thrusts.

The many other objects and advantages of my invention will be better understood by reference to the following specification when considered in connection with the accompanying drawing illustrating selected embodiments thereof, in which:—

Fig. 1 is an elevation of my improved shock absorber incorporated in the front end of a well-known make of automobile, and Fig. 2 is an elevation of a modified form of my invention.

Referring to the drawings, the shock absorber comprises a rigid support or perch 5 which has its lower end secured to the front axle 6 of the automobile. A socket or housing 7 is provided at the upper extremity of this perch to receive one extremity of the coil spring 8 which forms the shock dissipating element of the device. The opposite end of this spring 8 fits within a socket or housing 9 on the laterally projecting arm 10 of the lever 11. The outer end of this lever 11 is connected to the corresponding end of the usual leaf spring 12 of the vehicle by a shackle 13. The inner end of this lever rests on a bracket 14' attached to the car body. A shackle 14 connects the perch 5 with the lever 11 intermediate the ends of the lever. A disk 15 is preferably provided within the socket or housing 9 to permit the tension of the spring 8 to be varied by the set screw 16 in the housing.

In the operation of the device the spring 8 resists both downward and rebound thrusts. The downward thrust causes the shackle 13 to pull downwardly the outer end of the lever 11, compressing the spring 8. A rebound thrust causes the leaf spring 12 to pull upon the shackle 13 which in turn pulls downwardly the portion 17 of the lever 11 between the outer end of this lever and the point of connection of the lever and the shackle 14. This action causes the housing 9 to be swung toward the opposing housing 7 on the rigid support 5 and the spring 8 to be compressed. This movement is augmented by the free upper end of the lever 11 being forced upwardly by the bracket 14' or other practically non-yielding portion of the car on which this end rests.

The modified form of my invention illustrated in Fig. 2 is practically identical with the previous embodiment with the exception that the inner end of the lever 18 rests upon the substantially rigid upper portion of the leaf spring instead of upon a bracket on the car body. This lever 18 corresponds to the lever 11 of the embodiment illustrated in Fig. 1.

The different positions of the lever 11 or 18 cause the outer end of the leaf spring to vary in proximity to the free inner ends of these levers and also to the pivotal connection of the shackle 14 and the rigid support 5.

This combination pivots and links allows a very free movement to the shock absorbing medium. The entire construction is simple and durable and may be easily and quickly attached to an automobile.

I am aware that many changes may be made in the form and arrangement of parts without departing from the spirit of my invention and I reserve the right to make all such as fairly fall within the scope of the following claims.

I claim as my invention:

1. In a vehicle, the combination with a body member and a frame member, of means for resiliently supporting said body member on said frame member comprising, a leaf spring secured to one of said members, a lever fulcrumed intermediate its ends on the other of said members, the outer end of said lever being connected to the outer end of said spring and the inner end being directly supported in a yielding manner on the vehicle, and a spiral spring interposed between said other member and the portion of said lever between the fulcrum point and the inner end thereof.

2. In a vehicle the combination with a body and a frame, of means for resiliently supporting said body on said frame comprising, a leaf spring secured to said body, a lever connected intermediate its ends by a link to said frame, the outer end of said lever being connected to the outer end of said spring and the inner end being directly supported in a yielding manner on the vehicle, and a spiral spring interposed between said frame and the portion of said lever between said link connection and said inner end.

3. In a vehicle, the combination with a body and a frame, of means for resiliently supporting said body on said frame comprising, a leaf spring secured to said body, a lever having its outer end linked to the outer end of said spring and its inner end being directly supported in a yielding manner on the vehicle, a housing for a spiral spring, located intermediate the ends of said lever, a link connecting said frame with said lever between said housing and the outer end of the lever, and a spiral spring interposed between said housing and said frame.

4. In a vehicle, the combination with a body and a frame, of means for resiliently supporting said body on said frame comprising, a rigid support on said frame, a leaf spring secured to said body, a lever having one end linked to an end of the vehicle spring, the other end being directly supported in a yielding manner on the vehicle, a housing for a spiral spring, located intermediate the ends of said lever, a link connecting said support with said lever intermediate the linked end of the lever and said housing, and a spiral spring interposed between said housing and said support.

5. In combination, a vehicle having a spring, a lever member above and longitudinal in relation thereto, one end of the lever member being shackled to one end of the vehicle spring, the other end being directly supported in a yielding manner on the vehicle, intermediate an end of the vehicle spring and the vehicle, a housing for a spiral spring, located intermediate the ends of the lever member, a shackle fulcrumed intermediate the shackle end of the lever member and the spiral spring housing, a rigid support fixed to the vehicle and connected to the lever member by said shackle, and a spiral spring interposed between the rigid support and the lever member.

6. In a vehicle, the combination with a body and a frame, of means for resiliently supporting said body on said frame comprising, a rigid support projecting upwardly from said frame, a leaf spring secured to said body, a lever fulcrumed intermediate its ends on said support, the outer end of said lever being connected to the outer end of said spring and the free inner end being slidably supported by said body, a spiral spring housing on said support above the point of fulcrum of said lever, and a spiral spring interposed between said housing and the free inner end portion of said lever.

7. In a vehicle, the combination with a body and a frame, of means for resiliently supporting said body on said frame comprising, a rigid support projecting upwardly from said frame, a spiral spring housing formed on the upper end of said support, a leaf spring secured to said body, a lever above said leaf spring having its outer end linked to the end of said leaf spring and its inner end slidably supported by said body, a spiral spring housing on said lever near its inner end, a link connected at one end to said support below the spring housing thereon and at the other end of said lever between the outer end thereof and the spring housing thereon, and a spiral spring interposed between said housings.

EDWARD F. McCARTHY